Patented June 6, 1950

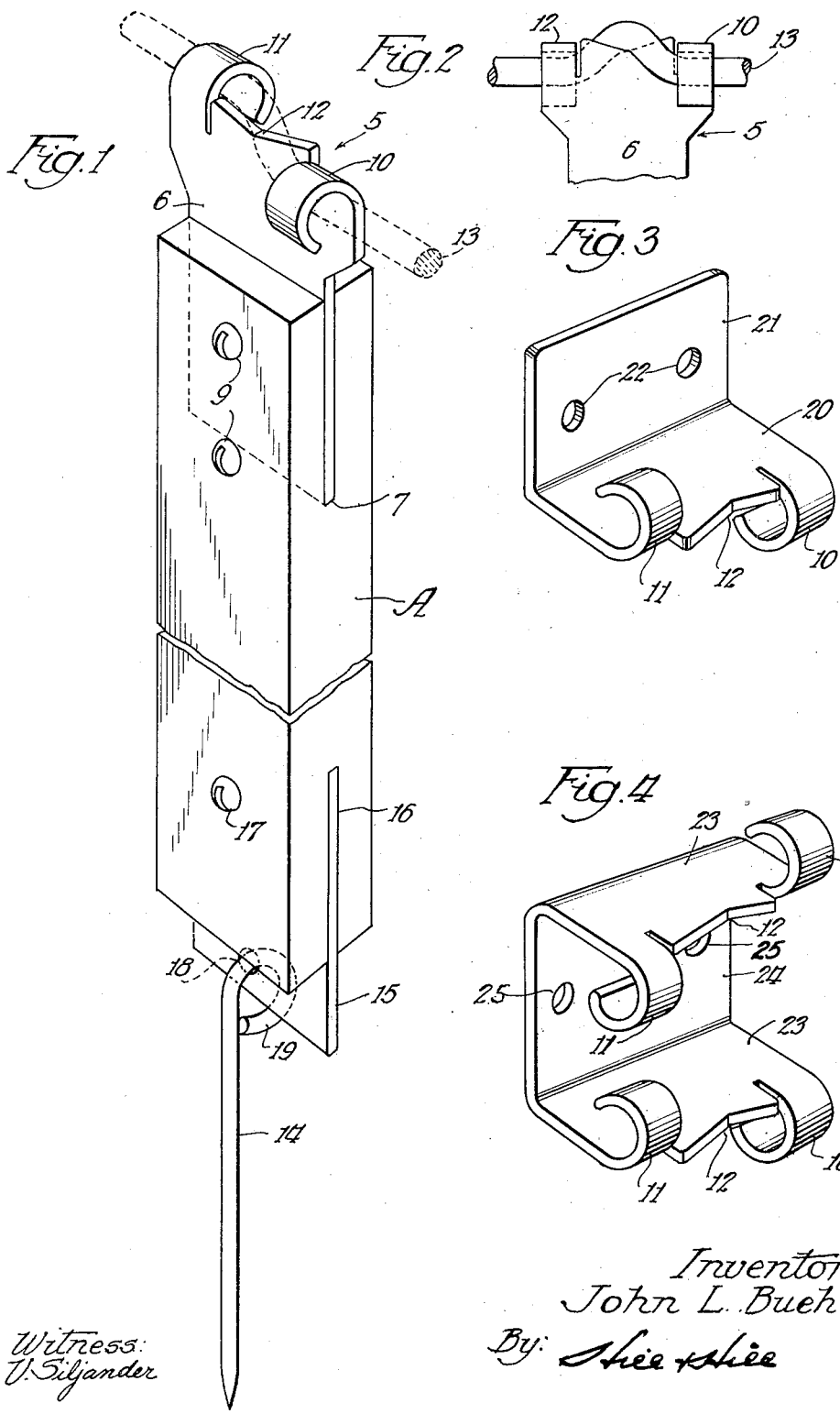

2,510,862

UNITED STATES PATENT OFFICE 2,510,862

LINE HOLDER

John L. Buehl, Washington, Ill.

Application November 17, 1945, Serial No. 629,215

1 Claim. (Cl. 24—129)

This invention relates to a line holder and its principal object is the provision of a line holder adapted to be secured upon a clothes pole, or upon a wall, post or other object, and having means whereby a line may be securely fastened to it and it will prevent the line from slipping or becoming detached until it is intentionally disconnected therefrom.

Another object is to provide a simple and inexpensive line holder that may be readily attached to a clothes pole or other object.

Another object is to provide a line holder that may be struck up from sheet metal by suitable dies.

Other objects and advantages will appear in the course of this specification and with said objects and advantages in view, this invention consists in the several novel features hereinafter fully set forth and claimed.

The invention is clearly illustrated in the drawing accompanying this specification, in which:

Fig. 1 is a perspective view of a clothes pole partly broken away and equipped with a line holder embodying a simple form of the present invention;

Fig. 2 is a fragmental side elevation thereof with a fragment of a line secured thereto;

Fig. 3 is a perspective view of a modified form of the invention, and

Fig. 4 is a perspective view of another modified form of the invention.

Referring to said drawing and first to Figures 1 and 2, which illustrate a simple embodiment applied to a clothes pole, the reference character 5 designates a line holder as a whole, here shown as comprising a flat body portion 6, adapted to be inserted into a saw kerf 7 formed in one end of the clothes pole A, and having screw holes through which screws 9 may be inserted in fastening the line holder to the clothes pole.

The flat portion 6 of the line holder is extended at both side edges in the form of two reversely curved horns 10, 11, one curved in one direction from the flat portion and the other curved in the opposite direction therefrom. Between the horns, the edge of the flat portion is formed with a shallow V-shaped notch 12.

In use, one of the horns is hooked over a line 13, the line carried across the V notch and the other horn is then hooked over the line. The reversely directed horns direct the line across the V notch forming a reverse bend in the line against which the edge of the V notch bears and positively prevents the clothes pole from slipping along the line or from being disconnected therefrom in spite of any amount of shaking the pole may be subjected to.

To facilitate holding the clothes pole in any desired fixed position, a short pin 14 is attached to the lower end of the clothes pole by a plate 15 held in a saw kerf 16 in the lower end of the pole and secured thereto by a screw 17. The plate 15 protrudes beyond the lower end of the saw kerf and has a hole 18 in the protruding end through which hole an eye or loop 19 of the pin is passed to connect the pin with the plate. The pin is struck into the ground, thereby holding the lower end of the pole in the position in which it is placed.

In the modified form of the invention, illustrated at Fig. 3, the flat portion 20 of the line holder has an end portion 21 bent at right angles thereto and provided with screw holes 22, whereby it may be screwed or nailed to a wall, post or other support. In other respects, the line holder illustrated in Fig. 3, is substantially of the same construction as the one shown in Figures 1 and 2, and the line may be attached to the line holder in the same manner as has been described in connection with Figs. 1 and 2.

In the modified form of the invention, illustrated in Fig. 4, the line holder shown in Fig. 2 is practically duplicated. The two flat portions 23 being connected by a flat connecting portion 24 which extends at right angles to the flat portions 23. The connecting portion 24 is formed with screw holes 25, whereby the line holder may be screwed or otherwise fastened upon a post, wall, or other support. With this form of the line holder, two lengths of line may run from the line holder to differently located points.

It is to be understood that the use of the line holder is not limited to clothes lines, but it has an indefinite number of uses, among which is the use of a line holder for anchor lines on a boat.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

In a line holder, a sheet metal body providing a base portion lying in substantially a single plane, said base portion having a notch in the longitudinal edge intermediate the ends of the latter, with the portions at each side of said notch forming spaced, outwardly extending projections, said base portion being slit at the inner edge of each projection, one of said projections being reversely bent to form a hook positioned at one side of said base portion, and the other projection being reversely bent in the opposite direction to form a hook at the opposite side of said base portion, with the axes of said hooks extending substantially parallel to one another and lying in a common plane extending substantially perpendicular to said base portion, the bottom edge of said notch being substantially V-shaped and extending outwardly from said plane, whereby a rope engaged with said hooks may extend across said bottom edge, with the portion of the rope engaged with said edge being outwardly offset from the plane of the hook axes.

JOHN L. BUEHL.

REFERENCES CITED

The following references are of record in the file of this patent:

UNITED STATES PATENTS

| Number | Name | Date |
|---|---|---|
| 490,250 | Herrick | Jan. 17, 1893 |
| 562,528 | Hakanson | June 23, 1896 |
| 839,311 | Hutchison | Dec. 25, 1906 |
| 1,205,496 | Whitehead | Nov. 21, 1916 |
| 1,251,778 | Humble | Jan. 1, 1918 |
| 1,494,161 | Fairbanks | May 13, 1924 |
| 2,356,908 | Arrowsmith | Aug. 29, 1944 |

FOREIGN PATENTS

| Number | Country | Date |
|---|---|---|
| 26,071 | Great Britain | Nov. 30, 1905 |
| 356,217 | France | Nov. 23, 1905 |
| 644,997 | France | Oct. 17, 1928 |